(12) United States Patent
Lee et al.

(10) Patent No.: US 10,216,726 B2
(45) Date of Patent: Feb. 26, 2019

(54) APPARATUS AND METHOD FOR DETERMINING TRANSLATION WORD

(71) Applicant: SAMSUNG ELECTRONICS CO., LTD., Suwon-si (KR)

(72) Inventors: Ho Dong Lee, Yongin-si (KR); Sang Hyun Yoo, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 23 days.

(21) Appl. No.: 15/188,405

(22) Filed: Jun. 21, 2016

(65) Prior Publication Data

US 2017/0031899 A1    Feb. 2, 2017

(30) Foreign Application Priority Data

Jul. 31, 2015    (KR) .................. 10-2015-0109154

(51) Int. Cl.
*G06F 17/28*    (2006.01)
*G06F 17/27*    (2006.01)

(52) U.S. Cl.
CPC ...... *G06F 17/2836* (2013.01); *G06F 17/2735* (2013.01); *G06F 17/2818* (2013.01)

(58) Field of Classification Search
CPC ............. G06F 17/2836; G06F 17/2818; G06F 17/2735

See application file for complete search history.

(56) References Cited

U.S. PATENT DOCUMENTS

| 7,620,539 B2 | 11/2009 | Gaussier et al. |
| 7,734,459 B2 | 6/2010 | Menezes et al. |
| 2009/0132243 A1* | 5/2009 | Suzuki ............. G10L 21/04 704/216 |

(Continued)

FOREIGN PATENT DOCUMENTS

| JP | 2003-345828 | * 12/2003 |
| JP | 2010-9237 A | 1/2010 |

(Continued)

OTHER PUBLICATIONS

Tamer Alkhouli et al., "Vector Space Model for Phrase-based Machine Translation", Oct. 25, 2014, Proceedings of SSST-8, Eighth Workshop on Syntax, Semantics and Structure in Statistical Translation, pp. 1-10, Doha, Qatar. @2014 Association for Computational Linguistics.*

(Continued)

*Primary Examiner* — Qian Yang
(74) *Attorney, Agent, or Firm* — NSIP Law

(57) ABSTRACT

An apparatus for determining a translation word includes a word vector generator configured to generate a word vector corresponding to an input word of a first language with reference to a first word vector space that is related to the first language, a word vector determiner configured to determine a word vector of a second language, wherein the determined word vector of the second language corresponds to the generated word vector, using a matching model, and a translation word selector configured to select a translation word of the second language, wherein the selected translation word corresponds to the input word of the first language, based on the determined word vector of the second language.

25 Claims, 7 Drawing Sheets

(56) References Cited

U.S. PATENT DOCUMENTS

2009/0248394 A1* 10/2009 Sarikaya ............. G06F 17/2818
 704/4
2014/0350914 A1* 11/2014 Andrade Silva .... G06F 17/2818
 704/2

FOREIGN PATENT DOCUMENTS

JP 2014-10634 A 1/2014
KR 10-1027007 B1 4/2011

OTHER PUBLICATIONS

Machine translation for JP2003-345828, Dec. 2003, by Kasahara.*

* cited by examiner

APPARATUS AND METHOD FOR DETERMINING TRANSLATION WORD

CROSS-REFERENCE TO RELATED APPLICATIONS

This application claims the benefit under 35 USC 119(a) of Korean Patent Application No. 10-2015-0109154, filed on Jul. 31, 2015 in the Korean Intellectual Property Office, the entire disclosure of which is incorporated herein by reference for all purposes.

BACKGROUND

1. Field

The following description relates to an automatic translation technology. The following description also relates to an apparatus for determining a translation word. The following description also relates to a method for determining a translation word.

2. Description of Related Art

When trying to find a word with a similar meaning to a translation word, there exists a method for accomplishing this goal by using a synonym dictionary or a thesaurus to search for a translation word, such as by providing synonyms or words with similar meanings. Such a method operates by finding out a translation word with regard to the given words through providing a pair of synonyms or words with similar meanings, which are built in for each field. However, a great deal of effort and time by the professionals in the relevant field are required to build such a synonym dictionary or a thesaurus. In addition, even by using such a method, it is still difficult to find out the translation word with regard to new words. For example, which synonym is appropriate may depend upon the context of the translation.

Meanwhile, as machine learning technology develops, there is a method of finding out a translation word by learning a pair of parallel sentences through a parallel corpus in multiple languages. However, such an approach still results in requiring a lot of effort and time required for a task of building the corpus, where the pair of parallel words exists.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus for determining a translation word includes a word vector generator configured to generate a word vector corresponding to an input word of a first language with reference to a first word vector space that is related to the first language, a word vector determiner configured to determine a word vector of a second language, wherein the determined word vector of the second language corresponds to the generated word vector, using a matching model, and a translation word selector configured to select a translation word of the second language, wherein the selected translation word corresponds to the input word of the first language, based on the determined word vector of the second language.

The apparatus may further include a word inputter configured to receive the input word of the first language.

The translation word selector may be configured to select a word vector, wherein the selected word vector is the most similar to the determined word vector of the second language, from among word vectors on a second word vector space that is related to the second language, and select, as the translation word, a word of the second language, wherein the word of the second language corresponds to the selected word vector.

The translation word selector may be configured to select the word vector, wherein the selected word vector is the most similar to the determined word vector of the second language, from among the word vectors on the second word vector space by using at least one of a distance measurement function, a similarity measurement function, or a correlation coefficient.

The distance measurement function may be one of Euclidean distance, Mahalanobis distance, or Hamming distance, the similarity measurement function may be cosine similarity, and the correlation coefficient may be one of Pearson correlation coefficient, Spearman correlation coefficient, partial correlation coefficient, or Cronbach's alpha.

The first word vector space may be built in advance through using machine learning using a first language corpus, and the second word vector space may be built in advance using machine learning using a second language corpus.

The first word vector space may be built by generating word vectors for each word of the first language and mapping the generated word vectors for each word of the first language to the vector space of the first language, and the second word vector space may be built by generating word vectors for each word of the second language and mapping the generated word vectors for each word of the second language to the vector space of the second language.

A machine learning algorithm used during machine learning may be one of a neural network, a decision tree, a genetic algorithm (GA), a genetic programming (GP), a Gaussian process regression, a linear discriminant analysis (LDA), a K-near neighbor (K-NN), a perceptron algorithm, a radial basis function network, a support vector machine (SVM), and deep-learning.

The matching model may be a model for matching the first word vector space to a second word vector space that is related to the second language.

The matching model may be built in advance through machine learning by using language resources that define a relation between the first and second languages.

The language resources may include at least one of a synonym dictionary or a thesaurus.

The determined translation word may not be predefined as a translation by the language resources.

In another general aspect, a method of determining a translation word includes generating a word vector corresponding to an input word of a first language with reference to a first word vector space that is related to the first language, determining a word vector of a second language, wherein the determined word vector of the second language corresponds to the generated word vector, by using a matching model, and selecting a translation word of the second language, wherein the selected transition word corresponds to the input word of the first language, based on the determined word vector of the second language.

The method may further include receiving the input word of the first language.

The selecting of the translation word may include selecting a word vector, wherein the selected word vector is the most similar to the determined word vector of the second language, from among word vectors on a second word vector space that is related to the second language, and selecting, as the translation word, a word of the second language, wherein the word of the second language corresponds to the selected word vector.

The selecting of the word vector, wherein the selected word vector is the most similar to the determined word vector of the second language, may include selecting the word vector, which is the most similar to the determined word vector of the second language, from among the word vectors on the second word vector space by using at least one of a distance measurement function, a similarity measurement function, or a correlation coefficient.

The distance measurement function may be one of Euclidean distance, Mahalanobis distance, or Hamming distance, the similarity measurement function may be cosine similarity, and the correlation coefficient may be one of Pearson correlation coefficient, Spearman correlation coefficient, partial correlation coefficient, or Cronbach's alpha.

The first word vector space may be built in advance using machine learning using a first language corpus, and the second word vector space may be built in advance using machine learning using a second language corpus.

The first word vector space may be built by generating word vectors for each word of the first language and mapping the generated word vectors for each word of the first language to the vector space of the first language, and the second word vector space may be built by generating word vectors for each word of the second language and mapping the generated word vectors for each word of the second language to the vector space of the second language.

A machine learning algorithm used during machine learning may be one of a neural network, a decision tree, a genetic algorithm (GA), a genetic programming (GP), a Gaussian process regression, a linear discriminant analysis (LDA), a K-near neighbor (K-NN), a perceptron algorithm, a radial basis function network, a support vector machine (SVM), and deep-learning.

The matching model may be a model for matching the first word vector space to a second word vector space that is related to the second language.

The matching model may be built in advance through machine learning by using language resources that define a relation between the first and second languages.

The language resources may include at least one of a synonym dictionary or a thesaurus.

The determined translation word may not be predefined as a translation by the language resources.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The embodiments of the present invention are now to be described more fully with reference to the accompanying drawings. In the following description, a detailed description of known functions and configurations incorporated herein is omitted when it may obscure the subject matter with unnecessary detail. Terms used throughout this specification are defined in consideration of functions according to embodiments, and may be varied according to a purpose of a user or manager, or precedent and so on. Therefore, definitions of the terms are to be made on the basis of the overall context.

Figure 1:
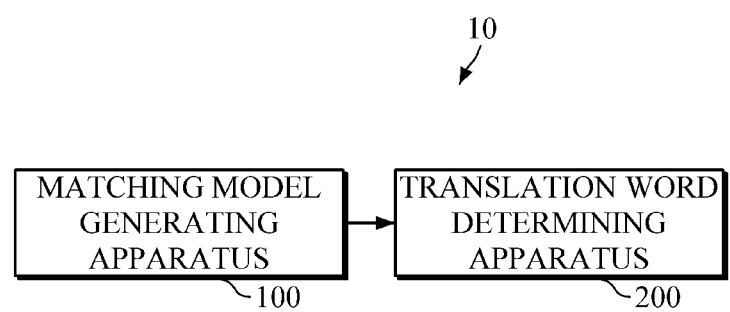
FIG. 1 is a diagram illustrating an example of a system for determining a translation word according to an embodiment.

FIG. 1 is a diagram illustrating an example of a system for determining a translation word according to an embodiment.

Referring to FIG. 1, a system 10 for determining a translation word may include a matching model generating apparatus 100 and a translation word determining apparatus 200.

The matching model generating apparatus 100 may build word vector spaces based on the corpus of each language, including the original or first language and the target or second language, and generate a matching model for matching the built word vector space of each language. For example, the matching model generating apparatus 100 generates the first language's word vector space, hereinafter referred to as 'first word vector space,' based on the first language's corpus, and the second language's word vector space, hereinafter referred to as 'second word vector space,' based on the corpus of the second language. The matching model generating apparatus 100 also generates a matching model for matching the first and second word vector space.

For example, the translation word determining apparatus 200 may determine the translation word regarding an input word by using the matching model that has been generated at the matching model generating apparatus 100. For example, the translation word determining apparatus 200 may determine the second language's translation word with regard to the first language's word by using the matching model.

Hereinafter, the matching model generating apparatus 100 is more specifically described with reference to FIG. 2; and the translation word determining apparatus 200 is more specifically described with reference to FIG. 3.

Figure 2:
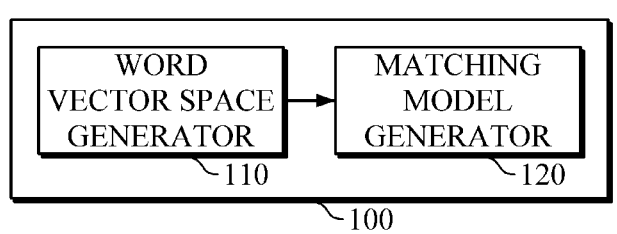
FIG. 2 is a diagram illustrating an example of a matching model generating apparatus.

FIG. 2 is a diagram illustrating an example of a matching model generating apparatus.

Referring to FIG. 2, a matching model generating apparatus 100 for generating a matching model may include a word vector space generator 110 and a matching model generator 120. However, these are only example elements of the matching model generating apparatus 100 and the matching model generating apparatus 100 may include other elements, as appropriate.

In an example, the word vector space generator 110 may build a word vector space with regard to each language, namely, the first and second languages.

In one embodiment, the word vector space generator 110 may build the word vector space with regard to each language through a process of machine learning by using a corpus of each language. For example, the word vector space generator 110 generates the word vector with regard to each word of the first language through the machine learning by using the corpus of the first language, hereinafter referred to as 'first language corpus,' and maps the generated word vector to the first language's vector space so as to build the word vector space with regard to the first language, hereinafter referred to as 'first word vector space.' Also, the word vector space generator 110 generates the word vector with regard to each word of the second language through the machine learning process by using the corpus of the second language, hereinafter referred to as 'second language corpus,' and maps the generated word vector to the second language's vector space so as to build the word vector space with regard to the second language, hereinafter referred to as 'second word vector space.'

In the example of FIG. 2, the matching model generator 120 may generate the matching model for matching the first word vector space and the second word vector space. For example, in one embodiment, the matching model generator 120 may learn, through the machine learning, the matching between the word vector within the first word vector and the word vector within the second word vector space by using language resources that define the relationship between the first and second languages that is, a synonym dictionary, a thesaurus, and so on, thereby generating the matching model.

Here, a machine learning algorithm that is used for generating the word vector space and the matching model may include a neural network, a decision tree, a genetic algorithm (GA), a genetic programming (GP), a Gaussian process regression, a linear discriminant analysis (LDA), a K-near neighbor (K-NN), a perceptron algorithm, a radial basis function network, a support vector machine (SVM), deep-learning, etc. However, embodiments are not limited to the above-mentioned examples. In other embodiments, other examples of machine learning algorithms that are able to properly generate the word vector space and the matching model are used instead of or in addition to the above-mentioned example approaches to perform the machine learning tasks.

Figure 3:
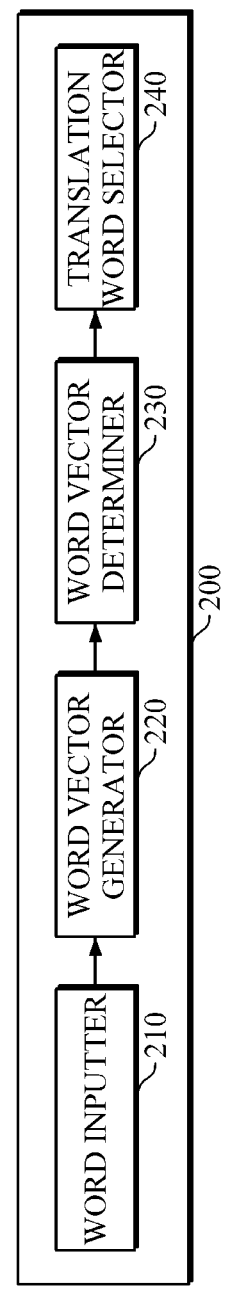
FIG. 3 is a diagram illustrating an example of a translation word determining apparatus.

FIG. 3 is a diagram illustrating an example of a translation word determining apparatus.

Referring to FIG. 3, a translation word determining apparatus 200 for determining a translation word may include a word inputter 210, a word vector generator 220, a word vector determiner 230, and a translation word selector 240.

For example, the word inputter 210 may receive an input of the first language's word, hereinafter referred to as 'input word.'

In this example, the word vector generator 220 may generate a word vector regarding the input word, hereinafter referred to as 'input word vector,' that has been input through the word inputter 210, with reference to the first word vector space built at the word vector space generator 110, with reference to FIG. 2.

Accordingly, the word vector determiner 230 may determine the second language's word vector, hereinafter referred to as 'target word vector,' that corresponds to the input word vector, by using the matching model that has been generated by the matching model generator 120, with reference to FIG. 2. For example, the word vector determiner 230 may match the input word vector to the second word vector space based on the matching model so as to determine the target word vector on the second word vector space that corresponds to the input word vector based on the previously completed preparatory mapping.

Then, the translation word selector 240 may select the second language's translation word that corresponds to the input word, based on the determined target word vector. For example, the translation word selector 240 may select, based on the determined target word vector, the word vector, which is the most similar to the target word vector, from among a plurality of word vectors on the second word vector space, and select the word, which corresponds to the selected word vector, as the translation word regarding the input word. Such a translation is likely to be a good translation because the correspondence indicates that such a translation is the most reasonable translation, based on the machine learning from the corpus.

In one embodiment, the translation word selector 240 may select the word vector, which is chosen to be the most similar to the target word vector, from among a plurality of word vectors present on the second language vector space by using a distance measurement function. The word vector space is built so that the word vector of the similar word is located in the shortest distance with respect to the vector space. Thus, the translation word selector 240 may select the word vector, which is located in the nearest distance to the target word vector, as the word vector that is the most similar to the target word vector, by using the distance measurement functions defined appropriately over the vector space. For example, possible distance functions include the Euclidean distance, the Mahalanobis distance, and the Hamming distance.

In another embodiment, the translation word selector 240 may select the word vector, which is the most similar to the target word vector, from among a plurality of the word vectors on the second word vector space, by using a similarity measurement function, such as the cosine similarity. However, other similarity measurement functions are used in various embodiments.

In yet another embodiment, the translation word selector 240 may select the word vector, which is the most similar to the target word vector, from among a plurality of the word vectors on the second word vector space, by using a correlation coefficient. Here, the correlation coefficient may include the Pearson's correlation coefficient, the Spearman correlation coefficient, Partial correlation coefficient, and Cronbach's alpha. However, the examples for the correlation coefficient are not limited thereto, and other correlation coefficients are used in various embodiments.

Additionally, the translation word selector 240 may use all the word vectors present on the second word vector space as the subject for determining the similarity, and also use a part of the word vector on the second word vector space, for example, the word vectors that are located within a certain regular distance of the target word vector on the second word vector space, as the subject for determining the similarity. However, the examples of the subject for determining the similarity are not limited to this particular example, and the range thereof may be also determined based on various other standards according to the performance and use of a system, such as usage aspects of a particular example or scenario.

Figure 4:
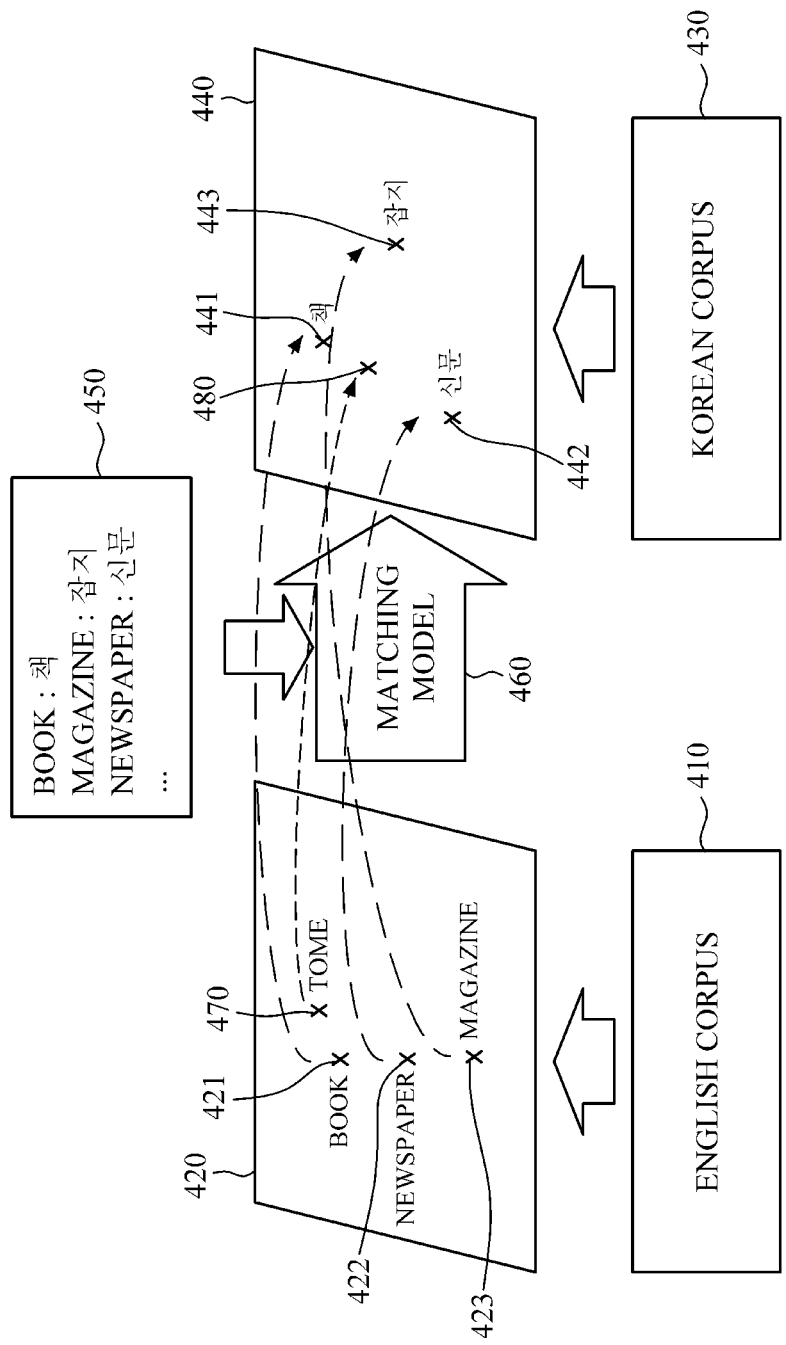
FIG. 4 is a diagram illustrating an example of a process for generating a matching model and a translation word.

FIG. 4 is a diagram illustrating an example of a process for generating a matching model and a translation word. In the example, it is assumed that a Korean word corresponding to the English word "TOME" is not previously defined in a synonym dictionary 450.

Referring to the examples of FIGS. 2 to 4, a word vector space generator 110 generates word vectors 421 to 423 with respect to "BOOK," "NEWSPAPER," and "MAGAZINE" through machine learning by using an English corpus 410, and by mapping the generated word vectors 421 to 423 to the English word vector space 420, generates English word vector space 420. In addition, the word vector space generator 110 generates the word vectors 441 to 443 regarding the Korean words "책," "신문" and "잡지" through machine learning by using a Korean corpus 430, and by mapping the generated word vectors 441 to 443 to the Korean vector space, generates the Korean word vector space 440.

By using English and Korean synonym dictionaries 450, a matching model generator 120 generates the matching model 460 by learning, through the machine learning, the matching between the word vectors 421 to 423 within the English word vector space 420 and the word vectors 441 to 443 within the Korean word vector space 440. As illustrated in FIG. 4, the word vector "BOOK" 421 is matched to the word vector "책" 441 by the generated matching model 460, "NEWSPAPER" 422 is matched to "신문" 442, and "MAGAZINE" 423 is matched to "잡지" 443, respectively.

When "TOME" is input through a word inputter 210, a word vector generator 220 generates an input word vector 470 regarding the input word "TOME," with reference to English word vector space 420.

Accordingly, a word vector determiner 230 determines a target word vector 480 on the Korean word vector space 440, which corresponds to the input word vector 470, by using the generated matching model 460. As a result, the target word vector 480 is usable to help find a translation in the target language for the original term.

A translation word selector 240 selects a word vector 441, which is determined to be the most similar to a target word vector 480, from among the word vectors 441 to 443 on the Korean word vector space 440, based on the determined target word vector 480. Accordingly, the translation word selector 240 determines the word corresponding to the selected word vector 441, that is, "책," to be the translation word for the input word "TOME."

Alternatively put, a translation word determining apparatus 200 for determining a translation word may determine that the word "TOME," which is not predefined by the synonym dictionary 450 or a thesaurus, as the translation word "책," and provides a user with the translation word "책" as an appropriate translation word without requiring that the validity of the match be specifically predefined. Instead, the machine learning allows for a determination that the translation is a valid suggestion based on the learned similarities between the original language and the target language.

Figure 5:
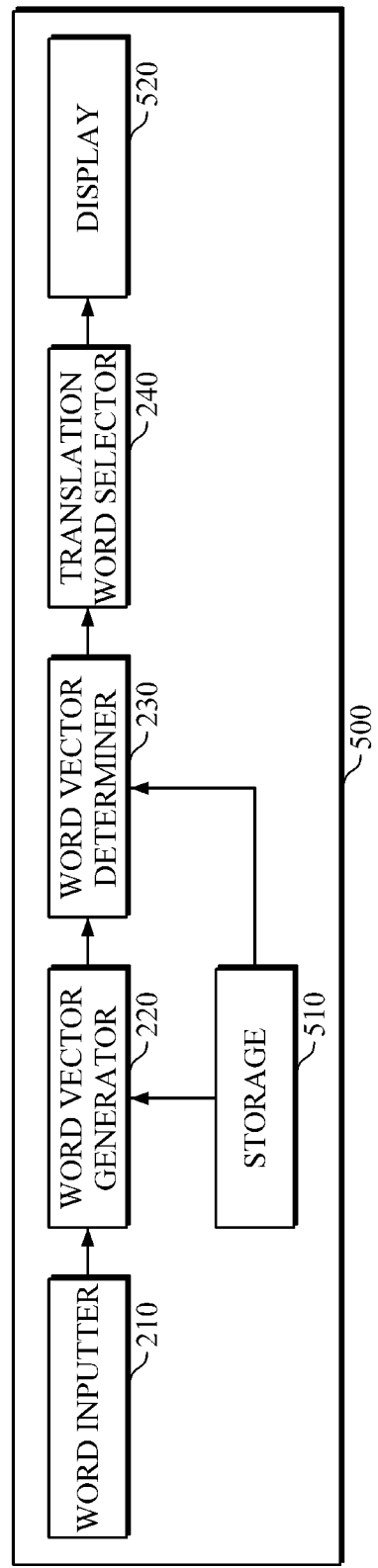
FIG. 5 is a diagram illustrating another example of an apparatus for determining a translation word.

FIG. 5 is a diagram illustrating another example of an apparatus for determining a translation word.

Referring to FIG. 5, a translation word determiner 500 may further include, optionally, one or both of storage 510 and a display 520, in addition to the elements of a translation word determiner, which is illustrated in FIG. 3.

The storage 510 may store information regarding word vector space that is generated by a word vector space generator, with reference to FIG. 2. For example, the storage 510 may store information regarding a first word vector space related to a first language, and information regarding a second word vector space related to a second language.

The storage 510 may store a matching model, which is generated by a matching model generator 120, with reference to FIG. 2.

The storage 510 may include one or more of several types of memory technology, such as a flash memory type memory, a hard disk type memory, a multimedia card micro type memory, and a card type memory, for example, SD or XD memory, and so on, a random access memory (RAM), a static random access memory (SRAM), a read only memory (ROM), an electrically erasable programmable read only memory (EEPROM), a programmable read only memory (PROM), a magnetic memory, a magnetic disk, an optical disk, and so on. However, these are only examples of types of storage, and it is to be recognized that other storage technologies are used in other examples.

For example, the display 520 may visually display information that is processed by the apparatus 500. The display 520 may visually display the second language's translation word chosen to be an appropriate counterpart with respect to the first language's input word.

The display 520 may include a liquid-crystal display (LCD), a thin-film-transistor liquid-crystal display (TFT LCD), an organic light-emitting diode (OLED), a flexible display, a 3D display, a glasses-type display, for example, a head-mounted display (HMD), a face-mounted display (FMD), an eye-mounted display (EMD), and an eye glass display (EGD), and the like. However, these are only examples of types of display, and it is to be recognized that other display technologies are used in other examples.

Figure 6:
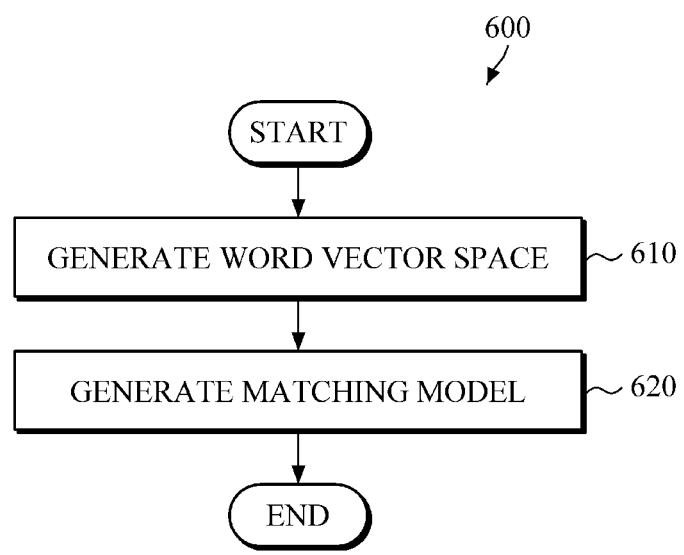
FIG. 6 is a diagram illustrating an example of a method of generating a matching model.

FIG. 6 is a diagram illustrating an example of a method of generating a matching model.

Referring to FIGS. 2 and 6, a method 600 of generating a matching model includes operation 610 of generating, initially, a word vector space regarding each language, including the first and second languages. Such a method may be performed by a system 10 for determining a translation word. For example, a word vector space generator 110 generates the word vector regarding each word of the first language through machine learning by using the first language corpus, and then maps the generated word vector to the first language's vector space, thereby generating the first word vector space. In addition, the word vector space generator 110 also generates the word vector regarding each word of the second language through machine learning by using the second language corpus, and then maps the generated word vector to the second language's vector space, thereby generating the second word vector space.

Subsequently, a matching model, which matches the first word vector space to the second word vector space, is generated by the method in operation 620. For example, a matching model generator 120 may learn, through the machine learning, the matching between the word vector within the first word vector and the word vector within the second word vector space by using language resources that define the relation between the first and second languages, thereby generating the matching model. For example, such resources may include a synonym dictionary, a thesaurus, and so on. Such resources include entries that map words in one language to one or more words in another language with similar meanings and/or definitions.

Here, a machine learning algorithm used for generating the word vector space and the matching model may include a neural network, a decision tree, a genetic algorithm (GA), a genetic programming (GP), a Gaussian process regression, a linear discriminant analysis (LDA), a K-near neighbor (K-NN), a perceptron algorithm, a radial basis function network, a support vector machine (SVM), deep-learning, and so on. However, these are only example algorithms, and possible algorithms for generating the word vector space and the matching model are not limited thereto.

Figure 7:
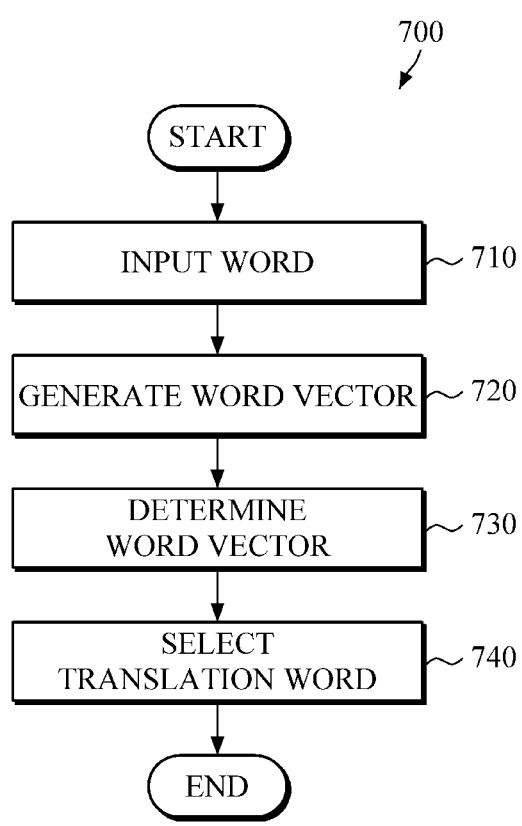
FIG. 7 is a diagram illustrating an example of a method of determining a translation word.

FIG. 7 is a diagram illustrating an example of a method of determining a translation word.

Referring to FIGS. 3 to 7, a method 700 of determining a translation word includes an operation 710 of receiving first an input of the first language's word, that is, an input word.

Then, a word vector with regard to an input word, hereinafter, referred to as 'input word vector,' is generated, by the method, in 720, with reference to the first word vector space that has been built in advance.

Then, the second language's word vector, referred to as target word vector, corresponding to the input word vector is determined, by the method, in 730, by using the matching model, built in advance. For example, a word vector determiner 230 may determine the target word vector on the second word vector space that corresponds to the input word vector by matching the input word vector to the second word vector space based on the matching model.

Then, the second language's translation word corresponding to the input word is selected based on the determined target word vector, by the method, in 740. For example, a translation word selector 240 selects, based on the determined target word vector, the word vector, which is the most similar to the target word vector, from among a plurality of word vectors existing on the second word vector space. The method also selects the word, which corresponds to the selected word vector, as the translation word regarding the input word.

For example, the translation word selector 240 may select the most similar word vector to the target word vector among the plurality of word vectors existing on the second word vector space by using at least one of a distance measurement function, a similarity measurement function, and a correlation coefficient. Such a selection is discussed further, above.

In such an example, the distance measurement functions may include the Euclidean distance, the Mahalanobis distance, the Hamming distance, and so on. The similarity measurement functions may include cosine similarity, and so on. The correlation coefficient may include the Pearson correlation coefficient, the Spearman correlation coefficient, the partial correlation coefficient, Cronbach's alpha, and so on.

The apparatuses, units, modules, devices, and other components illustrated in FIGS. 1-7 that perform the operations described herein with respect to FIGS. 1-7 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-7. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described herein with respect to FIGS. 1-7 are performed by computing hardware, for example, by one or more processors or computers, as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for determining a translation word, the apparatus comprising:
    one or more processors configured to:
        generate a word vector, corresponding to an input text word of a first language, in a first language word vector space predefined with respect to the first language;
        determine, using a trained matching model that considers the generated word vector, a resulting target word vector in a second language word vector space predefined with respect to a second language, the trained matching model being trained and generated in advance through machine learning by using language resources that define a relation between the first and second languages; and
        determine a translation word of the second language, based on the determined resulting target word vector of the second language,
    wherein the generating of the word vector in the first language vector space further includes generating one or more word vectors, in the first language vector space, for respective input text words that respectively do not have predefined correspondences in the second language,
    wherein the determining of the resulting target word vector in the second language vector space further includes determining one or more respective resulting target word vectors, in the second language vector space, corresponding to the generated one or more word vectors, and
    wherein the determining of the translation word further includes determining translation words of the second language for the respective input text words, including determining one or more translation words for the one or more respective target word vectors that are vectors of the second language vector space without correspondence to a word in the second language.

2. The apparatus of claim 1, wherein the one or more processors are further configured to receive the input text word of the first language.

3. The apparatus of claim 1, wherein, in the determining of the translation word, the one or more processors are further configured to:
    determine a word vector, based on a determination that the determined word vector is the most similar to the determined resulting target word vector of the second language, from among word vectors in the second language word vector space that is predefined with respect to the second language; and
    determine, as the translation word, a word of the second language, wherein the word of the second language corresponds to the determined word vector.

4. The apparatus of claim 3, wherein the one or more processors are further configured to determine the word vector, wherein the determined word vector is determined to be the most similar to the determined resulting target word vector of the second language, from among the word vectors in the second language word vector space by using at least one of a distance measurement function, a similarity measurement function, or a correlation coefficient.

5. The apparatus of claim 4, wherein the distance measurement function is one of Euclidean distance, Mahalanobis distance, or Hamming distance;
    the similarity measurement function is cosine similarity; and
    the correlation coefficient is one of Pearson correlation coefficient, Spearman correlation coefficient, partial correlation coefficient, or Cronbach's alpha.

6. The apparatus of claim 3, wherein the first language word vector space is built in advance through using machine learning using a first language corpus; and
    the second language word vector space is built in advance using machine learning using a second language corpus.

7. The apparatus of claim 6, wherein the first language word vector space is built by generating word vectors for each word of the first language and mapping the generated word vectors for each word of the first language to the first language vector space of the first language, and wherein the second language word vector space is built by generating word vectors for each word of the second language and mapping the generated word vectors for each word of the second language to the second language vector space of the second language.

8. The apparatus of claim 6, wherein respective machine learning algorithms used during the machine learning using the first language corpus, the machine learning using the second language corpus, and/or machine learning of the trained matching model is one of a neural network, a decision tree, a genetic algorithm (GA), a genetic programming (GP), a Gaussian process regression, a linear discriminant analysis (LDA), a K-near neighbor (K-NN), a perceptron algorithm, a radial basis function network, a support vector machine (SVM), and deep-learning.

9. The apparatus of claim 1, wherein the trained matching model is a model trained for matching the first language word vector space to the second language word vector space.

10. The apparatus of claim 1, wherein the language resources include at least one of a synonym dictionary or a thesaurus.

11. The apparatus of claim 1, wherein the determined translation word is not predefined as a translation by the language resources.

12. A processor-implemented method of determining a translation word, the method comprising:
    generating a word vector, corresponding to an input text word of a first language, in a first language word vector space predefined with respect to the first language;
    determining, using a trained matching model that considers the generated word vector, a resulting target word vector in a second language word vector space predefined with respect to a second language, the trained matching model being trained and generated in advance through machine learning by using language resources that define a relation between the first and second languages; and
    determining a translation word of the second language, based on the determined resulting target word vector of the second language,
    wherein the generating of the word vector in the first language vector space further includes generating one or more word vectors, in the first language vector space, for respective input text words that respectively do not have predefined correspondences in the second language,
    wherein the determining of the resulting target word vector in the second language vector space further includes determining one or more respective resulting target word vectors, in the second language vector space, corresponding to the generated one or more word vectors, and
    wherein the determining of the translation word further includes determining translation words of the second language for the respective input text words, including determining one or more translation words for the one or more respective target word vectors that are vectors of the second language vector space without correspondence to a word in the second language.

13. The method of claim 12, further comprising receiving the input text word of the first language.

14. The method of claim 12, wherein the determining of the translation word comprises:
    determining a word vector, based on a determination that the determined word vector is the most similar to the determined resulting target word vector of the second language, from among word vectors in the second language word vector space; and
    determining, as the resulting translation word, a word of the second language, wherein the word of the second language corresponds to the determined word vector.

15. The method of claim 14, wherein the determining of the word vector, based on the determination that the determined word vector is the most similar to the determined resulting target word vector of the second language, comprises:
    determining the word vector, which is determined to be the most similar to the determined resulting target word vector of the second language, from among the word vectors in the second language word vector space by using at least one of a distance measurement function, a similarity measurement function, or a correlation coefficient.

16. The method of claim 15, wherein the distance measurement function is one of Euclidean distance, Mahalanobis distance, or Hamming distance;
    the similarity measurement function is cosine similarity; and
    the correlation coefficient is one of Pearson correlation coefficient, Spearman correlation coefficient, partial correlation coefficient, or Cronbach's alpha.

17. The method of claim 14, wherein the first language word vector space is built in advance using machine learning using a first language corpus; and
    the second language word vector space is built in advance using machine learning using a second language corpus.

18. The method of claim 17, wherein the first language word vector space is built by generating word vectors for each word of the first language and mapping the generated word vectors for each word of the first language to the first language vector space of the first language, and wherein the second language word vector space is built by generating word vectors for each word of the second language and mapping the generated word vectors for each word of the second language to the second language vector space of the second language.

19. The method of claim 17, wherein respective machine learning algorithms used during the machine learning using the first language corpus, the machine learning using the second language corpus, and/or machine learning of the trained matching model is one of a neural network, a decision tree, a genetic algorithm (GA), a genetic programming (GP), a Gaussian process regression, a linear discriminant analysis (LDA), a K-near neighbor (K-NN), a perceptron algorithm, a radial basis function network, a support vector machine (SVM), and deep-learning.

20. The method of claim 12, wherein the trained matching model is a model trained for matching the first language word vector space to the second language word vector space.

21. The method of claim 12, wherein the language resources include at least one of a synonym dictionary or a thesaurus.

22. The method of claim 12, wherein the determined translation word is not predefined as a translation by the language resources.

23. An apparatus for determining a translation word, the apparatus comprising:
    one or more processors configured to:
        generate one or more word vectors, for respective input text words in a first language, in a first language word vector space predefined with respect to the first language, determine one or more respective target word vectors, using a trained matching model that respectively considers the generated one or more word vectors, in a second language word vector space predefined with respect to a second language, the trained matching model being trained and generated in advance based on learned correspondences between the first language word vector space and the second language word vector space, and
        indicate respective results of determinations of translation words of the second language, for the respective input text words, from the determined one or more respective target word vectors,
    wherein the determinations of the translation words of the second language include determining a translation word for one of the input text words based on a predefined vector mapping in the second language vector space of the translation word and including determining another translation word for another of the input text words based on a corresponding determined target word vector that does not have a predefined vector mapping in the second language vector space to the other translation word.

24. A translation word determining system, the system comprising:
   a first processor configured to generate a word vector, corresponding to an input text word of a first language, in a first language word vector space predefined with respect to the first language;
   a second processor configured to determine, using a trained matching model that considers the generated word vector, a resulting target word vector in a second language word vector space predefined with respect to a second language, the trained matching model being trained and generated in advance through machine learning by using language resources that define a relation between the first and second languages; and
   a third processor configured to determine a translation word of the second language, based on the determined resulting target word vector of the second language,
   wherein the generating of the word vector in the first language vector space further includes generating one or more word vectors, in the first language vector space, for respective input text words that respectively do not have predefined correspondences in the second language,
   wherein the determining of the resulting target word vector in the second language vector space further includes determining one or more respective resulting target word vectors, in the second language vector space, corresponding to the generated one or more word vectors,
   wherein the determining of the resulting target word vector in the second language vector space includes determining one or more respective target word vectors, in a second word vector space predefined with respect to the second language, including determining a translation word for a vector of the second language vector space without correspondence to a word in the second language, and
   wherein the trained matching model is configured based on learned correspondences between the first language word vector space and the second language word vector space.

25. The system of claim 24, wherein the first processor, the second processor, and the third processor are a same processor.

* * * * *